United States Patent [19]

Palmer et al.

[11] 4,010,772

[45] * Mar. 8, 1977

[54] TWO PART LIP SEALING MIXING VALVE FOR LAVATORIES, SINKS, ETC.

[75] Inventors: Patsy B. Palmer, Granada Hills; Julius L. Tolnai, Los Angeles, both of Calif.

[73] Assignee: Price Pfister Brass Mfg. Co., Pacoima, Calif.

[ * ] Notice: The portion of the term of this patent subsequent to May 9, 1989, has been disclaimed.

[22] Filed: Feb. 21, 1975

[21] Appl. No.: 551,673

Related U.S. Application Data

[63] Continuation of Ser. No. 241,653, April 6, 1972, abandoned, which is a continuation-in-part of Ser. No. 95,506, Dec. 7, 1970, Pat. No. 3,661,181.

[52] U.S. Cl. .......................... 137/625.17; 251/172
[51] Int. Cl.$^2$ ......................................... F16K 19/00
[58] Field of Search ................ 137/625.17, 625.41; 251/172, 175

[56] References Cited

UNITED STATES PATENTS

| | | | |
|---|---|---|---|
| 2,943,838 | 7/1960 | Skei | 251/172 X |
| 3,185,176 | 5/1965 | Webb | 137/625.17 |
| 3,445,087 | 5/1969 | Priese et al. | 251/172 |
| 3,472,484 | 10/1969 | Parker et al. | 251/172 |
| 3,661,181 | 5/1972 | Palmer et al. | 137/625.17 |
| 3,840,048 | 10/1974 | Moen | 137/625.41 |

*Primary Examiner*—William R. Cline
*Attorney, Agent, or Firm*—Flam & Flam

[57] ABSTRACT

This invention relates to a single-handled valve for controlling both combined volume and relative proportion of hot and cold water. A control valve stem extends between diametrically disposed moldable sealing members, the sealing members respectively cooperating with hot and cold water inlet openings. The axial and angular positions of the stem determine the combined volume and relative proportion while the sealing members perform all of the sealing functions between the inlet openings and the valve outlet.

2 Claims, 12 Drawing Figures

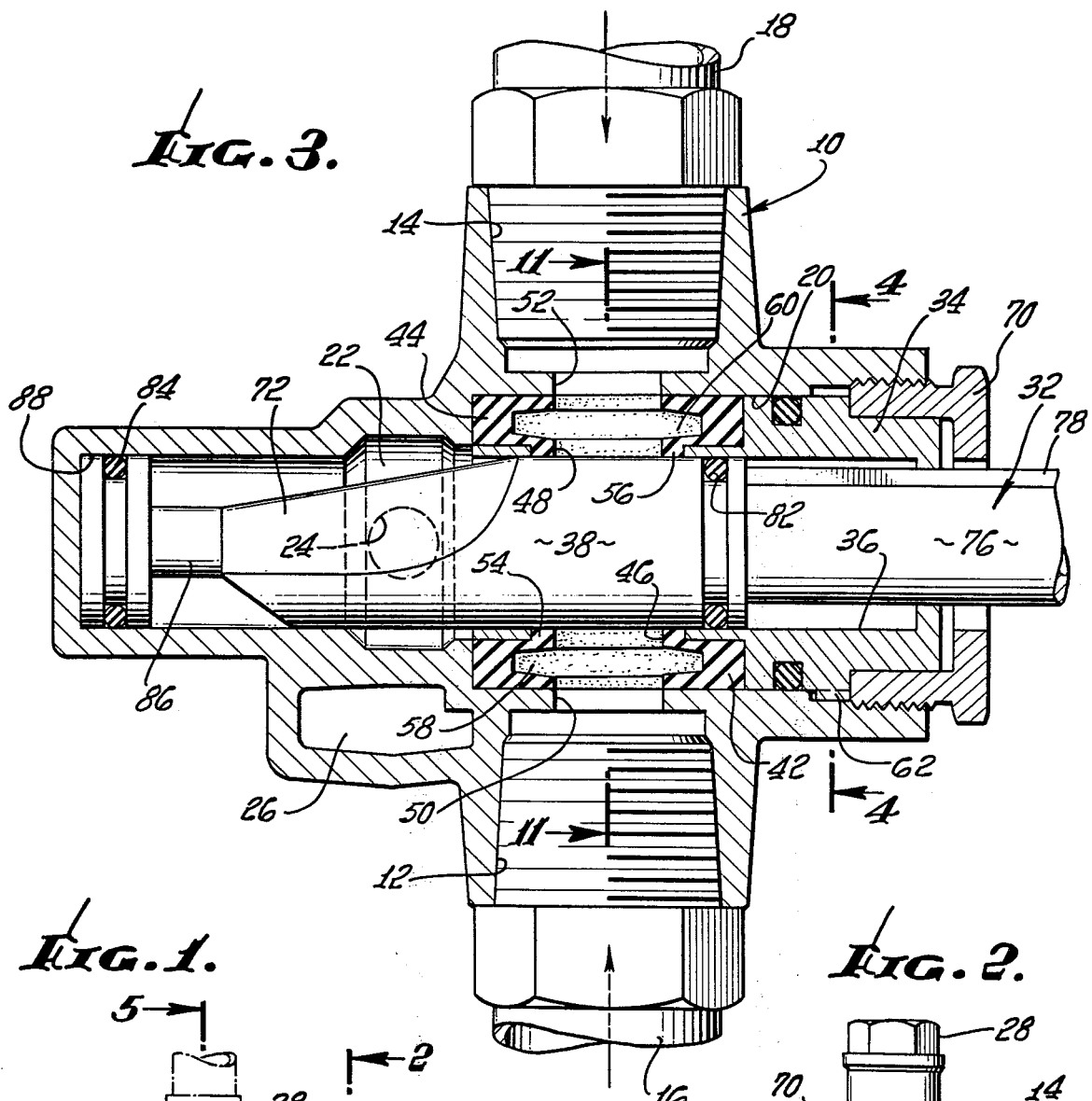
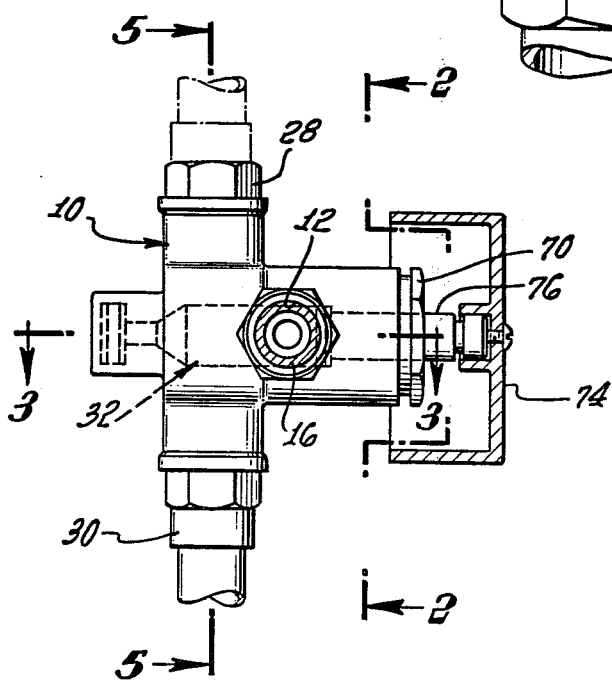

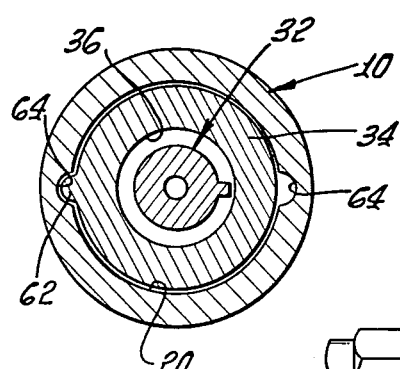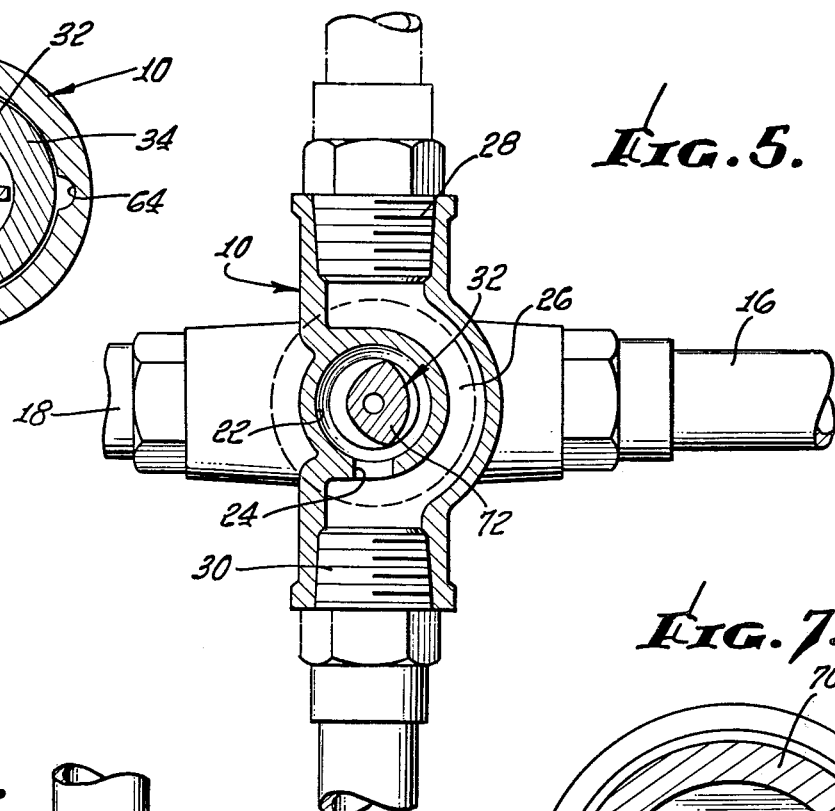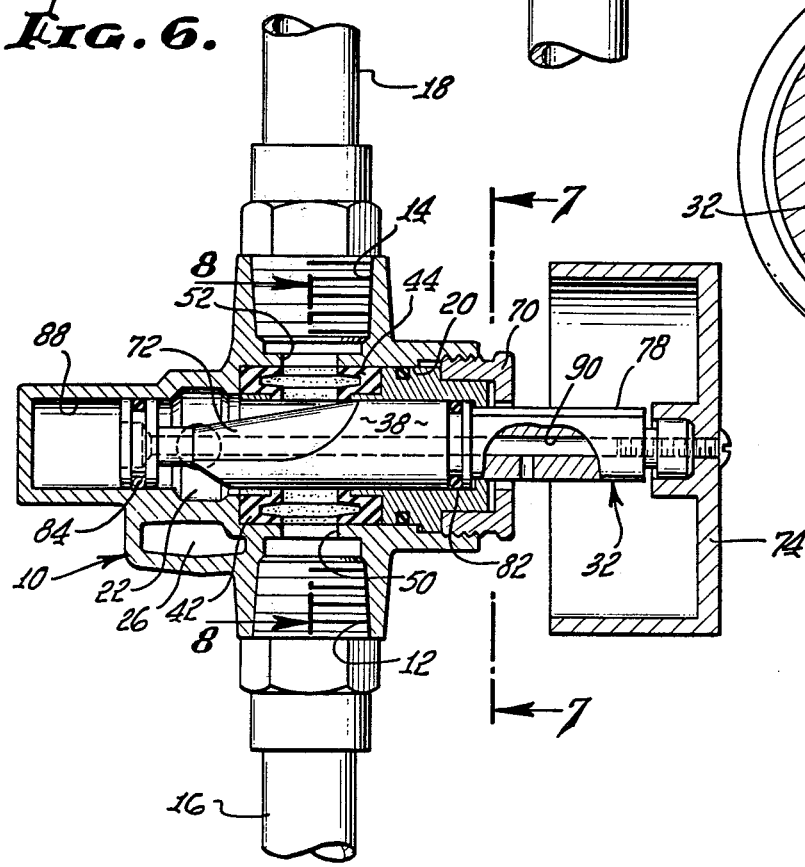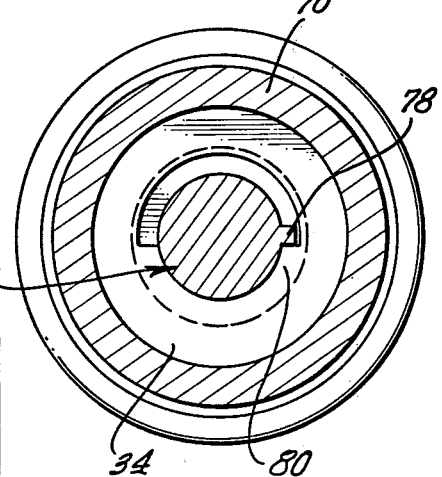

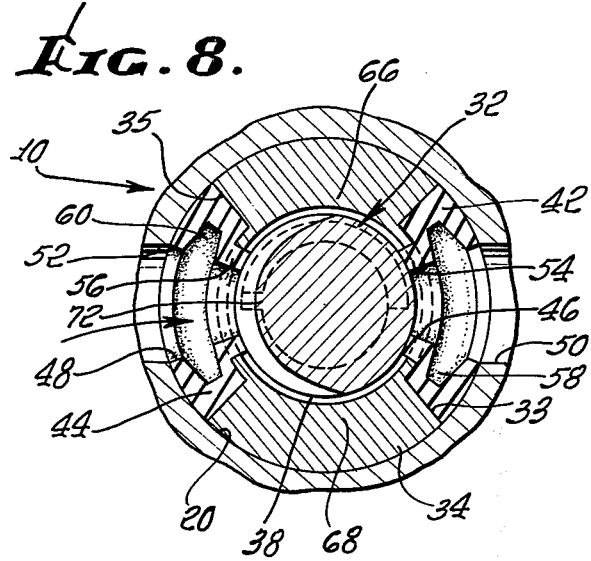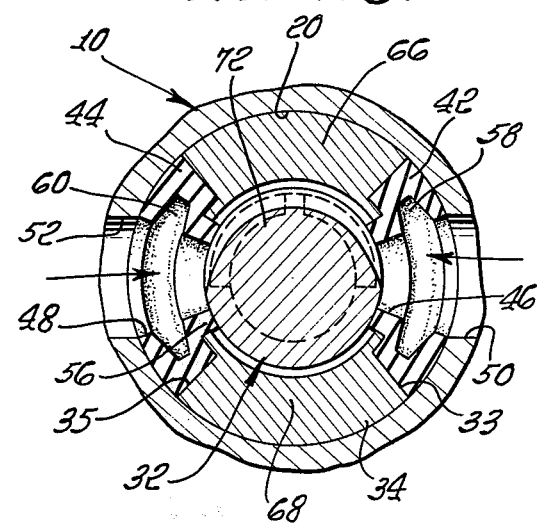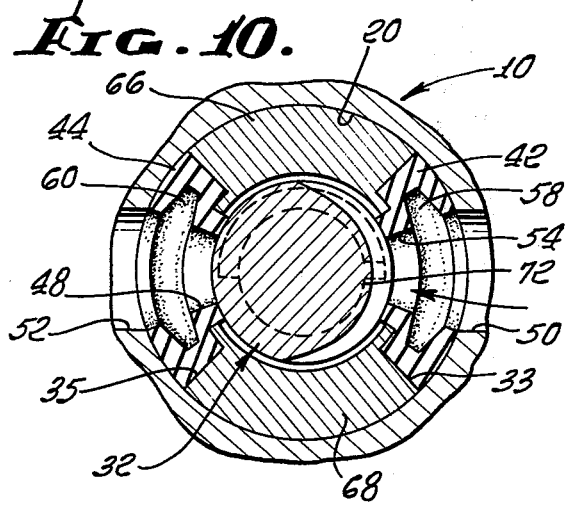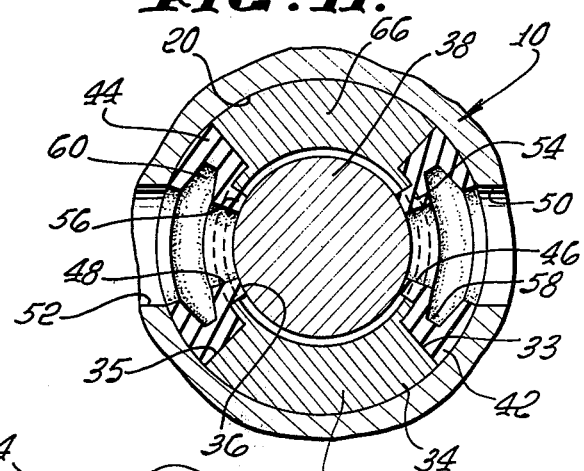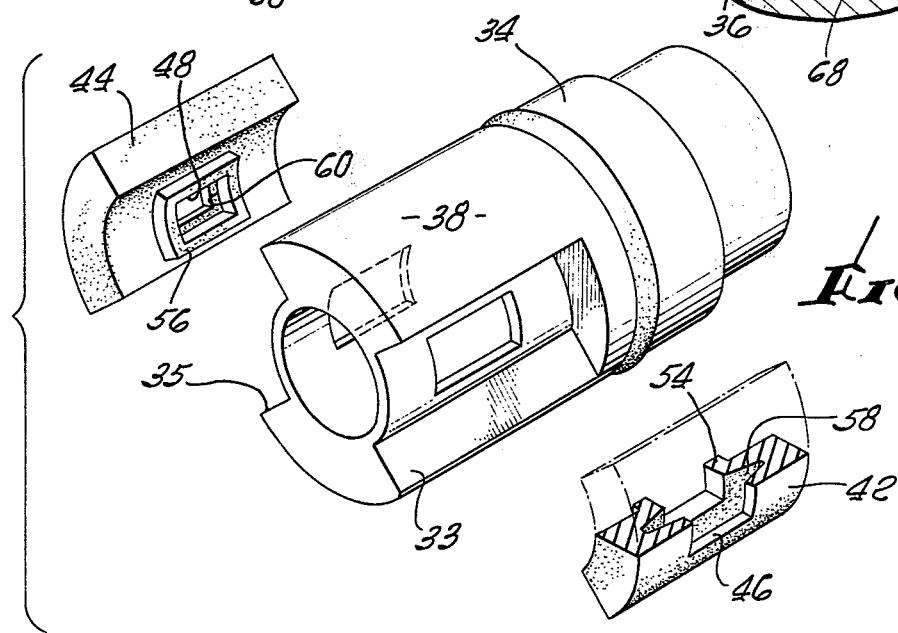

TWO PART LIP SEALING MIXING VALVE FOR LAVATORIES, SINKS, ETC.

RELATED PATENTS

This application is a continuation of application Ser. No. 241,653, filed Apr. 6, 1972, entitled TWO Part lip SEALING MIXING VALVE, now abandoned. Said application Ser. No. 241,653 was a continuation-in-part of an application Ser. No. 095,506, filed Dec. 7, 1970, entitled LIP SEALING MIXING VALVE FOR LAVATORIES, SINKS, ETC., now U.S. Pat. No. 3,661,181 issued May 9, 1972.

The term of this patent from and after the expriation of said parent Pat. No. 3,661,181 is hereby disclaimed. This patent shall be enforceable only for and during the period that this patent is commonly owned with said U.S. Pat. No. 3,661,181.

FIELD OF INVENTION

This invention relates to single-handled valves for controlling both combined volume and relative proportion of hot and cold water such as for a tub, shower or a combined tub and shower. Various classes of such valves have been devised. One widely accepted class utilizes a valve control member movable axially to determine relative proportion.

BACKGROUND OF THE INVENTION

Mixing valves having the axial-angular or cylindrical coordinate modes of movement very often require complex seal structures. Some efforts have been made to provide simpler seal structures for valves of this class. One known valve utilizes a flexible cup that fits into a valve chamber so as to overlie diametrically disposed hot and cold water inlets. A valve stem fits into the cup and in the closed position of the valve presses the cup into sealing contact with the inlets. The stem, however, is relieved so that as the stem is moved axially outwardly, the cup, under the influence of line pressure, flexes radially inwardly to an extent determined by the degree of proximity of the stem surface. By suitable design of the stem surface, angular position and axial position determine proportion and volume.

While this known valve structure is quite simple in terms of essential structure and in terms of replacement of parts, the seal has certain undesirable characteristics. Thus the line pressure opposes the establishment of a seal whereby large forces must be imposed on the flexible cup at the regions of the inlet openings. This reduces the life of the seal member.

Our U.S. Pat. No. 3,661,181 discloses a mixing valve structure of the cylindrical coordinate class in which a seal element performs all of the dynamic and static seal functions in such manner that line pressure assists in the establishment of the seals. The seal element so disclosed is sleeve-like, a valve control stem extending through the element. The seal element provides two atria for hot and cold water ports, the atria being flexed under the influence of line pressure to assit in providing a seal when the control stem is positioned close to the corresponding atrium.

The single seal element, however, is somewhat complicated and expensive. Desirably, the seal element is simplified to make replacement inexpensive. Accordingly, the primary object of this invention is to provide an improved seal structure that operates in the same advantageous manner.

SUMMARY OF THE INVENTION

In order to accomplish the foregoing object, we provide two simplified seal members both moldable from the same cavity, the members being supported by a cage that is accommodated in the bore of the casting and the control stem being slidably mounted in the cage.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is a side elevational view of a valve structure incorporating the present invention, the valve stem being shown in phantom lines, and the handle and one of the supply pipes being shown in section.

FIG. 2 is a sectional view taken along the offset plane indicated by line 2—2 of FIG. 1, and showing the orientation of fittings for the supply and discharge pipes.

FIG. 3 is an enlarged axial sectional view taken along a plane corresponding to line 3—3 of FIG. 1, and showing the assembled relationship of valve parts.

FIG. 4 is a transverse sectional view taken along a plane indicated by line 4—4 of FIG. 3, and showing the manner in which the valve cage is held against angular movement.

FIG. 5 is a vertical sectional view taken along a plane indicated by line 5—5 of FIG. 1, and showing the location and manner of interconnection of the tub and shower fittings.

FIG. 6 is a sectional view similar to FIG. 3 but showing the valve open.

FIG. 7 is an enlarged transverse sectional view showing the manner in which limits are imposed upon angular movement of the valve stem.

FIGS. 8, 9, 10 and 11 are enlarged fragmentary sectional views taken along a plane corresponding to line 8—8 of FIG. 6, and showing various valve positions, the valve stem being positioned to admit cold water in FIG. 8, to admit both cold and hot water in FIG. 9, to admit hot water in FIG. 10, and to close the valve in FIG. 11.

FIG. 12 is an exploded isometric view of the seal members and cage, one of the seal members being broken away and shown in section.

DETAILED DESCRIPTION

The following detailed description is of the best presently contemplated modes of carrying out the invention. This description is not to be taken in a limiting sense but is made merely for the purpose of illustrating the general principles of the invention since the scope of the invention is best defined by the appended claims.

The valve structure shown in FIGS. 1 to 12 includes a body 10 having interiorly threaded openings 12 and 14 on opposite sides (FIGS. 2 and 5) for connection of hot and cold water lines 16 and 18. Water entering the body 10 through the inlet openings 12 and 14 is conducted to the opposite sides of a generally cylindrical valve chamber 20 (FIG. 3). The inner end of the chamber 20 opens into a receiving chamber 22 (see also FIG. 5). Water from the receiving chamber 22 is conducted via port 24 to a surrounding arcuate outlet chamber 26 that connects with top and bottom outlet fittings 28 and 30. If only one outlet fixture is used, one of the fittings is plugged.

Water entering the valve chamber 20 is permitted to pass to the outlet chamber 26 in accordance with the axial and angular position of a valve stem 32. The valve stem 32 is surrounded and supported by a bonnet or cage 34. the cage fits into the valve chamber 20, and the stem in turn fits a cylindrical bore 36 of the cage. Only the central cylindrical portion 38 of the stem 32 actually fits the cage bore.

A pair of flexible sealing members (see also FIG. 12) provides the requisite static seals for confining flow from the inlet openings to the valve stem. The sealing members also provide the requisite dynamic seals operable in the closed position of the valve to cut off flow at the valve stem. The sealing members 42 and 44 are formed generally as cylindrical segments. they are made of flexible resilient material such as neoprene. The sealing members fit recesses 33 and 35 near the inner end of the cage 34 (See also FIG. 12). The sealing members and the cage are insertable as a unit in the valve body chamber 20 so as to be located in line with the hot and cold water inlets 12 and 14 (FIG. 6). As shown in FIG. 12, the outer surfaces of the sealing members 42 and 44 are cylindrically contoured to fit the valve chamber 20.

The sealing members 42 and 44 have ports 46 and 48 the outer ends of which register with reduced hot and cold water ports 50 and 52 at the inner ends of the openings 12 and 14.

The inner ends of the ports 46 and 48 have edges flush with the cage bore 36 (FIGS. 8–11) in order to cooperate with the exterior surface of the stem. For this purpose, the members 42 and 44 have bosses 54 and 56 interfitting corresponding apertures formed in the cage 34.

The sealing members 42 and 44 expand under the influence of line pressure in order to achieve effective seals. For this purpose, atria or ante chambers 58 and 60 are formed in the seal members 42 and 44 by intermediate enlarged portions of the ports 46 and 48. The atria 58 and 60 divide the sealing members 42 and 44 into thin lip parts respectively on the outside and on the inside. The outside lips contact the edges about the corresponding body inlet openings 50 and 52 and are urged outwardly under the influence of line pressure resulting from water entering the corresponding atria behind the lips. The inner lips are urged inwardly under the influence of line pressure entering the corresponding atria behind the lips.

When the cylindrical portion 38 of the valve stem is aligned with the sealing member, the lips are stressed to provide an effective seal. The flexing of the inner lips is limited by virtue of the support provided by the cage at the region of the embossments 54 and 56.

The ports 46 and 48 of the sealing members 42 and 44 are located to register with the body ports 50 and 52. For this purpose, the cage itself is located by the aid of an ear 62 (see also FIG. 4) that engages either one of two diametrically opposite slots 64 in the valve chamber 20. The sealing members 42 and 44 are held in position on the cage by the interfit of the bosses 54 and 56. The bosses do not sustain any stress upon turning of the cage 36. Thus, the sealing members are caused to turn with the cage by interaction with the intermediate portions 66 and 68 of the cage (FIG. 8). Furthermore, upon insertion of the cage, the end walls of the recesses 33 and 35 transmit the requisite forces. A nut 70 clamps the cage against the bottom of the valve chamber 20.

In order to open the ports 46 and 48, the valve stem 32 is moved outwardly of the chamber 20 to bring a relieved portion 72 thereof into operative position opposite the ports 46 and 48. This allows water to flow along the outside of the stem to the collection chamber 22. The sealing members are prevented from extreme flexure by the supporting cage. Yet the cage allows some flexure. The relieved portion 72 is tapered. Thus as the stem is moved outwardly, a larger effective flow channel is provided. The relieved portion 72 extends only part way around the circumference of the stem. Accordingly, angular movement of the stem from a neutral position reduces the size of the flow channel for one of the ports while the size of the flow channel for the other is increased. By judiciously controlling the configuration of the relieved portion 72, desired flow characteristics of the valve are determined.

In order to move the valve stem, a handle 74 is provided. The handle is secured in a conventional manner to a reduced end 76 of the stem. The reduced stem end has a ridge 78 (see FIG. 7) that cooperates with ends of an interior arcuate flange 80 formed at the outer end of the cage 34.

The water passing from the sealing member ports 46 and 48 along the exterior of the stem 38 is prevented from flowing outwardly by the aid of an O-ring 82 carried by the stem 32. Another O-ring 84, carried upon an inward extension 86 of the stem, defines, with a cylindrical recess 88 of the body, a pressure equalization chamber. the cylindrical recess 88 in which the O-ring 84 works is the same size as the bore 36 in which the sealing O-ring 82 works. By venting the recess 88 beyond the O-ring 84, it is ensured that the water pressure acting on the stem is longitudinally balanced. In order to vent the recess, the valve stem has an axial bore 90 (FIG. 6). The vent opens frontally to ensure against undetected leakage into the wall should the O-ring 84 fail.

The sealing members 42 and 44 are considerably simplified and readily molded. To replace the members, the nut 70 is removed after the handle 74 is detached. The stem 38 is pulled out and the cage is carried along. The sealing members are easily snapped out of the cage slots.

Intending to claim all novel, useful and unobvious features shown or described, we make the following claims:

1. In a mixing valve structure:
   a. a valve body having means forming a substantially cylindrical valve chamber;
   b. means forming hot and cold water inlet openings into the chamber at angularly spaced locations thereof;
   c. a valve stem extending into said chamber and having a substantially cylindrical exterior surface portion movable to oppose said inlet openings;
   d. a cage-like support attached to said body and having a hollow, substantially cylindrical portion interposed between said inlets and said valve stem, said cylindrical portion having a pair of angularly spaced, outwardly facing recesses respectively facing the hot and cold water inlets respectively, said recesses having inner walls provided with openings to the interior of said hollow portion for communication with said valve stem;
   e. a pair of sealing members made of flexible material fitted in said support recesses respectively, said sealing members each having a port establishing communication between its inlet, through the support recess opening to the stem;
f. each sealing member having a bead protruding through the corresponding recess opening for cooperation with said valve stem on the inside of said hollow portion;
g. said sealing members respectively extending entirely about the inward axial projection of the corresponding inlet opening to form operative static seals around the insides of the corresponding inlet openings;
h. each of said ports having an intermediate recessed enlargement forming an atrium subjected to supply inlet pressure to expand the sealing member into sealing engagement with the edges about the corresponding inlet opening and to urge the corresponding bead into sealing engagement with said cylindrical surface portion of said stem when the stem is in closed position;
i. said valve stem having flow channel means adjoining the cylindrical surface portion to control flow into said valve chamber from the inlet openings in accordance with the angular and axial positions of said valve stem;
j. said sealing members forming the only operable static and dynamic seals between said inlet openings and the exterior surface of said valve stem.

2. The combination as set forth in claim 1 in which said flow channel means is formed by a peripherally contoured surface portion adjoining said cylindrical surface portion.

* * * * *